United States Patent [19]

Eigenmann

[11] 3,981,557

[45] *Sept. 21, 1976

[54] LIGHT RETROREFLECTIVE SYSTEM FOR SIGN SURFACES

[76] Inventor: Ludwig Eigenmann, Vacallo, Ticino, Switzerland

[ * ] Notice: The portion of the term of this patent subsequent to Dec. 25, 1990, has been disclaimed.

[22] Filed: Aug. 26, 1974

[21] Appl. No.: 500,663

[30] Foreign Application Priority Data

Aug. 29, 1973  Italy .................................. 28320/73

[52] U.S. Cl. ................................ 350/104; 350/97; 350/109
[51] Int. Cl.² .................... G02B 5/126; G02B 5/128
[58] Field of Search ..................... 350/104, 105, 103

[56] References Cited
UNITED STATES PATENTS

| 3,036,928 | 5/1962 | Poole | 350/105 X |
| 3,556,637 | 1/1971 | Palmquist | 350/105 |
| 3,781,083 | 12/1973 | Eigenmann | 350/105 |

FOREIGN PATENTS OR APPLICATIONS

| 405,471 | 3/1933 | United Kingdom | 350/104 |
| 773,881 | 5/1957 | United Kingdom | 350/104 |

Primary Examiner—John K. Corbin
Assistant Examiner—B. W. de los Reyes
Attorney, Agent, or Firm—Michael J. Striker

[57] ABSTRACT

A light retroreflective system comprises a primary focusing transparent body having an exposed surface adapted to project externally of the surface of a sign forming material and operative for refracting and focusing light beams impinging on portions of said exposed surface, and a reflecting arrangement adjacent to areas below said sign surface and where said beams are focused. The exposed surface has, in its cross-sections in planes perpendicular to said sign surface, portions adjacent to the sign surface having radii or curvature smaller than half of the distance between the portions and the locations below the sign surface wherein the refracted beams focus, so that a proper focalization is ensured within said primary body, the primary body consisting of a transparent material the index of refraction of which is considerably lower than 1.9.

7 Claims, 7 Drawing Figures

U.S. Patent    Sept. 21, 1976    3,981,557
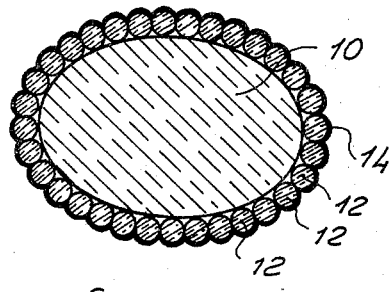
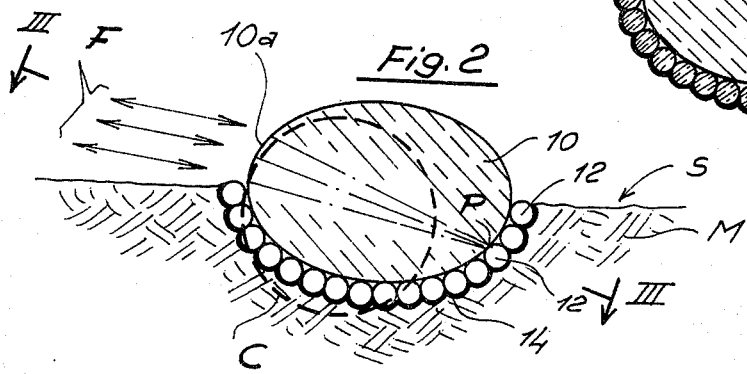
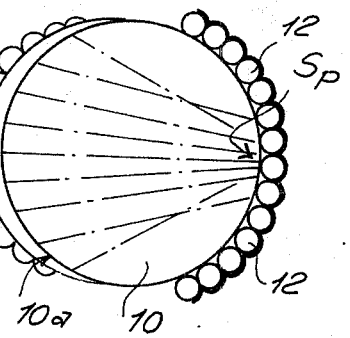
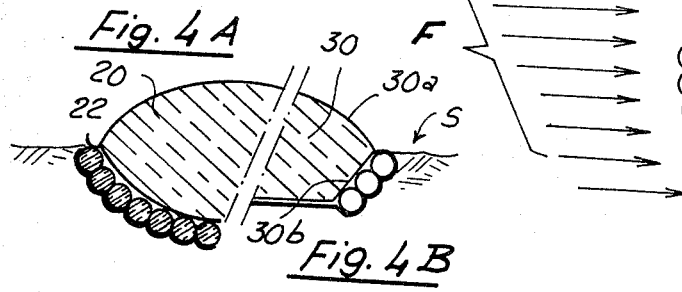
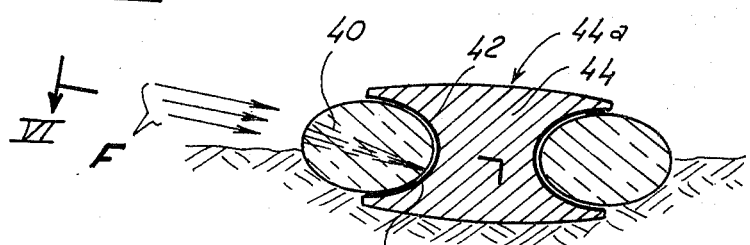
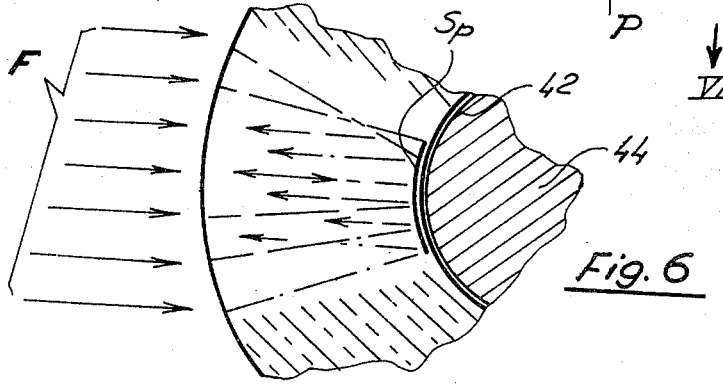

LIGHT RETROREFLECTIVE SYSTEM FOR SIGN SURFACES

BACKGROUND OF THE INVENTION a. The Field of the Invention

This invention is concerned with forming and using light retroreflective systems particularly adapted for being utilized in highway marking signs and advertising signs, to provide a distinguishing surface, and capable of reflecting light from such sources as headlight beams, for ensuring visibility at a distance in nighttime. The term retroflection is hereinafter used to designate a reflective means, element or system which will reflect an incident beam or ray of light in such a manner that a brilliant beam, generally a cone of light, is returned to the source of light even though the incident light strikes the surface of the retroreflective system at an angle.

b. The prior Art

This art is well known and extensive comments thereabout are believed to be unnecessary. Usually, the retroreflective system comprises retroreflective elements adapted to be partially embedded within a layer of a suitable composition, such as at a highway lane dividing line or otherwise in a traffic regulating sign formed on the road pavement, or in a preformed tape material designed to be applied on and adhesively secured to said pavement.

Some of such retroreflective systems comprise small optical systems each of which consists of a primary globular (generally spherical) transparent body which, when partially embedded in the sign forming material, has a part-spherical surface which projects exteriorly of the surface of the sign, the primary body having a refractive index which causes a light beam impinging on said exposed part-spherical surface to refract within said body and focus at a location of the surface of the body, which is approximately opposite to the area of light impingement, located below the sign surface and adjacent to a reflective arrangement, such as reflectorized microspheres, so that the impinging beam is reflected back along a path essentially parallel to its own incident path. These principles and phenomena are discussed in detail. For instance, in the specification of the British Pat. No. 1,343,196.

According to well known optical laws, a proper focusing as above, in a spherical lens, of a light beam impinging on a satisfactorily large area of the part-spherical exposed surface of the primary body, occurs only when such body is formed of a transparent material having a refractive index of from about 1.90 to 1.95. Therefore, to provide an optically efficient retroreflecting system of the prior art, costly, brittle and poorly weather resistant high refraction glasses are to be used. Additionally, the use of high refraction transparent material leads to an undesirable light dissipation by outward reflection at the primary body-air interface when the light ray impinges on the exposed surface of the body at a relevant angle of incidence.

In the U.S. Pat. No. 3,781,083, there is described an arrangement including spherical primary transparent bodies which can be made of a material having an index of refraction well below 1.90, such as from 1.45 to 1.68. This advantageous feature is made possible by the fact that the reflecting arrangement, such as reflectorized microspheres, is located at distance from the primary body, the light beams impinging on and refracted within said bodies focusing outside of said bodies. This arrangement cannot be successfully utilized for forming structurally unitary small retroreflecting systems.

Therefore, this invention has as its objects the provision of a novel and improved light retroreflecting system of the above type, the provision of a new and advantageous solution to the above and other problems, and more specifically the provision of a new optically improved retroreflecting system including a transparent primary body of a material having an index of refraction substantially lower than 1.90, such primary body being so structurally combined with a reflectorized reflecting arrangement that the most desirable high retroreflective efficiency can be achieved together with other advantages relating to traffic resistance and service time.

Essentially, according to the invention, there is provided a retroreflecting system including a primary focusing transparent body adapted to be partially embedded into a layer of a sign forming material and to provide a convex surface exposed to light impingement above the sign surface, said convex surface including portions adjacent to said sign surface of radius of curvature less than half of the path along which a light ray impinging on a location in said portion travels within said primary body towards a reflective means adjacent to said body and located below said sign surface.

Inasmuch as in a convex lens the distance from the convex surface impinged by a light beam and the point at which such beam is focused by the lens is inversely porportionate to the radius of curvature of such surface and to the index of refraction of the transparent material of which the lens is made, the geometry of the primary body of the new system is such as to provide the most proper focalization, and consequent correct retroreflection, of a beam of "grazing light," that is the light beams of interest which impinge on the exposed portion of the primary body in a direction forming an extremely small angle (such as 1° or 2°) with the sign surface, at a location nearly opposite to the area of impingement and below the sign surface, where the reflective means are adjacent, by forming such a primary body of a material having an index of refraction well below that necessary for providing a proper focalization in a spherical lens of the same radius of curvature.

Preferably, the geometry is such that the contours of the cross-sections of the primary body, in planes perpendicular to the sign surface, are elliptical at least in the exposed portions above said sign surface.

A retroreflective system according to the invention can therefore comprise a primary body consisting of the well known, economical and weather resistant "window pane glass" of index of refraction $n_D$ = 1.50–1.55. Most preferably, such primary body is formed of an advantageously less brittle, more weather resistant and only progressively worn off transparent polymeric composition, such as polyester resins ($n_D$ = 1.52–1.56), polystyrene resins ($n_D$ = 1.58–1.60), polyurethane resins ($n_D$ = 1.47 to 1.54), polycarbonates ($n_D$ = 1.58–1.60), and acrylic and metacrylic polymers ($n_D$ = 1.46–1.63), and their chemically compatible copolymers and mixtures.

These and other objects, advantages and features of the invention will become apparent from the following detailed description of some not limitative embodiments thereof, taken together with the accompanying drawings.

THE VIEWS OF THE DRAWINGS

FIG. 1 is a somewhat diagrammatical and greatly enlarged cross-sectional view of the system according to a first and preferred embodiment of the invention;

FIG. 2 is a diagrammatical cross-sectional view of the system of FIG. 1 in use;

FIG. 3 is a diagrammatical cross-sectional view taken in the plane indicated at III—III in FIG. 2;

FIGS. 4A and 4B are fragmentary cross-sectional views, similar to FIG. 2, of further embodiments of the invention;

FIG. 5 is a similar cross-sectional view of a modified embodiment of the invention; and FIG. 6 is a fragmentary enlarged cross-sectional view taken in the plane indicated at VI—VI in FIG. 5.

DETAILED DESCRIPTION OF THE PREFERRED EMBODIMENTS

Referring first to FIGS. 1 to 3, there is shown an improved retroreflective system including a primary transparent body 10 which, in its sections taken in planes perpendicular to a surface S (FIG. 2) of the sign forming material M, is elliptical. Said body, therefore, has a convex surface the radius of curvature of which is smallest at its portion adjacent to said surface S. This surface has a monolayer of microspheres 12 secured thereto by means of a proper transparent binder, and the outwardly facing portions of said microspheres are reflectorized by a reflective film 14 of silver or of aluminum, while the part of the body 10 which projects above the sign surface S, is uncoated and exposed to light impingement.

Preferably, the system is manufactured in the form shown in FIG. 1, wherein the primary body is completely covered with the monolayer of microspheres 12 and with the reflectorizing film 14. Upon partially embedding the system in the sign forming material M (a rolling action is preferably exerted for levelling the system in a flat condition at its proper depth, such as half of its smallest dimension), and before or after the complete setting of such material, according to a well known procedure, the portion of said film and monolayer which is adjacent to the portion projecting above the sign surface S, is subsequently stripped off, by a rotary brush, for example, or even by the traffic wear.

The manufacture of systems such a that shown in FIG. 1 is known and it will therefore not be described. Preferably, the procedure described in the Belgian Pat. No. 794,047 (and similarly in the published French Pat. Application No. 73.01279) can be employed.

FIG. 2 diagrammatically illustrates the optical advantages of the new system. Assuming that a beam F of light impinges on a portion 10a of the exposed dome shaped part of the primary body 10, in a direction enclosing a small angle (actually, a great deal smaller than that shown in FIG. 2) with the surface 5, this beam is refracted and concentrated by the lens portion 10a and focused in a point P (in the cross-sectional plane of FIG. 2). The distance between the air-lens interface at 10a and the focus at P is determined by the lens' parameters, that is the radius of curvature of said interface and the index of refraction of the transparent material of which the lens is formed. For better understanding, let us assume that the radius of curvature of the impinged lens area at 10a will nearly correspond to that of an imaginary circle such as that indicated in phantom line at C.

For proper service of a retroreflective aggregate of the type under consideration, the beams must focus in a point on or very near to the approximately opposite lens surface, below the sign surface S and adjacent to a reflectorized element, such as a microsphere 12. If the lens where a sphere of contour C, its index of refraction would necessarily have to be from 1.90 to 1.95 for focalizing on said contour C. Now, as a consequence of the elliptically shaped actual contour of the primary body 10, the distance between the impinged area at 10a and the actual focus at P is noticeably greater than twice the radius of curvature at 10a and, therefore, the primary body 10 can be advantageously produced of a glass or preferably a polymeric resin (such as those indicated above) having an index of refraction well below 1.90, such as between 1.46 and 1.63. Having properly selected the material based on various considerations (cost, resistance to weather and to traffic, and so on), the geometry of the primary body will be then selected with the needed elongation of its shape in cross-sectional planes perpendicular to the sign surface S.

An advantage of the new system consists in the fact that a suitable polymeric resin can be used to constitute a body which is not brittle but which is capable of progressive regular wear. The wearing of of the top of the dome shaped exposed part of the system does not affect, within certain limits, the efficiency of the retroreflective system because the surface of main interest is that adjacent to the sign surface S (where the radius of curvature is the smallest), that is a portion which is not adversely affected by such wear. Another important advantage of the new system is that it is formed as a body flatter that a conventional spherical one, and therefore more adapted for resisting wear and shearing forces applied in a direction parallel to the sign surface S, that is to the road pavement surface, such forces and stresses resulting, typically, from an emergency braking action of a vehicle traveling over a highway pavement marking.

The advantages of the new system will be now briefly commented on with reference to FIG. 3. A body, such as the primary body 10 of FIGS. 1 to 3, has elliptical cross-sections in planes perpendicular to the sign surface S only. Its cross-sections in planes parallel or nearly parallel to the surface S are circular or nearly circular. The section in the plane III—III which contains the refracted beam is shown in FIG. 3. It shows that, while the beam focuses in a point P in each vertical plane, it actually focuses on a short line, such as indicated at $S_p$ in said plane III—III. The light is therefore reflected back not as a precise cone, but as a beam of a flat fan-shaped configuration. This new feature, typical of the invention, is of great interest. As a matter of fact, the returned beam is still confined within a narrow angle in the vertical planes and therefore no undue light dissipation occurs either upwardly and downwardly. At the same time, the field of "horizontal visibility" of the sign is enlarged, and signs illuminated by the headlamps of an passing vehicle can be seen, at great distance, by the driver of the passed vehicle, thus improving the traffic safety in nighttime, for example.

From what was said above, it is evident that the invention resides in the fact that the geometry of the exposed portion of the primary focusing body is such that convex surfaces are provided for light impingement and refraction, having a curvature in planes perpendicular to the sign surface, for ensuring focalization in a given point farther than twice the radius of such curvature, and that the same body is adjacent, in locations not appertaing to said exposed portion, to a reflecting arrangement adapted for retroreflecting the beam focused in said point.

This feature, therefore, may be employed in several different configurations. For example, FIG. 4A illustrates a primary body 20 having the shape of a bi-convex lens having elliptical faces, the corner at 22, where such faces meet, not affecting the above discussed properties, in that such corner will remain nearly coplanar with the sign surface S, that is, it is at a location at which no light impingement can occur. In the example of FIG. 4B, the primary body 30 has an elliptically dome shaped exposed surface 30a and has a frustoconical portion 30b at the portion at the body 30 below the sign surface S, and to which the reflectorized microspheres are adjacent. The bottom face of such body 30 is a planar and preferably reflectorized.

The principle of the invention is also used in the embodiment of FIGS. 5 and 6. In this latter embodiment, the primary body 40 consists of an annulus or toroid of trasparent material of elliptical configuration in its radial planes. The inwardly facing areas of said body 40 are adjacent to a reflecting surface 42 formed in a groove of a grooved member 44 of synthetic plastic material, metal or metal alloy the member 44 having a traffic resistant upper face 44a. FIG. 6 illustrates the action of this embodiment, on an impinging light beam F, this action being similar to that described with reference to FIG. 3.

The system can be produced in any desired dimensions. Generally, the greatest diametral dimension is between 0.8 and 8 mm, while larger systems may be used for marking highway side lines, pedestrian crossing and so on. The ratio of the smallest (vertical) dimension and the greatest (horizontal) dimension can be between 1/1.1 and 1/1.5, for example, this ratio being basically dependent on the index of refraction of the material used. This ratio can decrease down to ½ and even less, when the exposed part of the system is flattened by traffic wear, while the system remains efficient, provided that a substantial annulus of the exposed surface having small radius of curvature will still be present above the sign surface S.

I claim:

1. A light retroflective arrangement for use in a sign having an exposed surface, comprising a body of transparent material having an index of refraction less than 1.9, said body having an outer surface of a configuration corresponding to that obtained by rotating an ellipse about its minor axis equiplanar with the exposed surface of the sign and normal to the major axis thereof, the major axis of the ellipse being positioned substantially coplanarly with the surface of the sign and a central plane normal to said major axis and subdividing the entire surface of said body into two surface portions which have smallest radii of curvature in regions adjacent said central plane, said body being embedded in said sign at said exposed surface so that one of said surface portions is exposed and is located externally of said sign and the other surface portion is concealed and is accommodated within said sign, said body being elliptical in all its sections taken in planes perpendicular to said sign surface light rays impinging on said region of said exposed surface portion at a small angle to said central plane being focussed at said concealed surface portion; and reflective means adjacent said concealed surface portion and operative for reflecting said light beams focused at said exposed surface portion.

2. A light retroreflective arrangement as defined in claim 1, wherein the said transparent body consists of transparent polymeric material the index of refraction of which is between 1.47 and 1.53.

3. A light retroreflective arrangement as defined in claim 1, wherein the said reflective means includes a monolayer of externally reflectorized microspheres.

4. A light retroreflective system as defined in claim 1, wherein said transparent body has, in any cross-section thereof in planes parallel to said central plane, a circular configuration.

5. A light retroflective arrangement as defined in claim 1, wherein said exposed surface is substantially planar; and wherein said central plane of said transparent body coincides with the plane of said exposed surface.

6. A light retroflective arrangement as defined in claim 1, wherein said transparent material has an index of refraction between about 1.46 and 1.63.

7. A light retroflective arrangement as defined in claim 1, wherein the distance between said region of said one surface and the focus amounts to more than twice the radius of curvature of said region.

* * * * *